J. C. BARLOW.
Wheel-Scrapers for Planters.

No. 158,885.                                  Patented Jan. 19, 1875.

Witnesses:                                   Inventor:
                                             Joseph C. Barlow
                                             by his attys
                                             Cox & Cox For the purpose of operating the scrapers, and locking them upon the wheels, substantially as shown and described.

UNITED STATES PATENT OFFICE.

JOSEPH C. BARLOW, OF QUINCY, ILLINOIS, ASSIGNOR TO VANDIVER CORN-PLANTER COMPANY, OF SAME PLACE.

IMPROVEMENT IN WHEEL-SCRAPERS FOR PLANTERS.

Specification forming part of Letters Patent No. 158,885, dated January 19, 1875; application filed August 22, 1874.

*To all whom it may concern:*

Be it known that I, JOSEPH C. BARLOW, of Quincy, Illinois, have invented certain new and useful Improvements in Wheel-Scrapers, of which the following is a specification, reference being had to the accompanying drawings.

The invention relates to an improvement in scrapers for vehicle-wheels, and is especially adapted to the wheels of seed-planters; and consists in a rod pivoted to an eccentric cam, or pivoted eccentrically to a cam placed in front of and below the driver's seat of a planter, the other end of the rod being secured to a rotating bar working in bearings at the end of the frame, and having near its ends scrapers of any desired form, which stand in juxtaposition to the circumferences of the wheels, all arranged so that as the cam is turned the rod is tightened. The bar being thus rotated brings the scrapers in contact with the wheels, and the object of the invention is accomplished.

Figure 1:
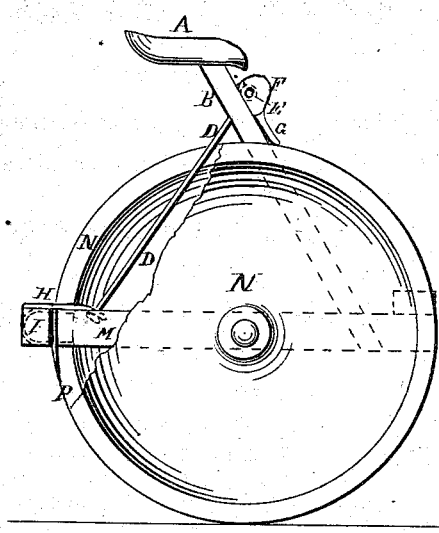
Figure 2:
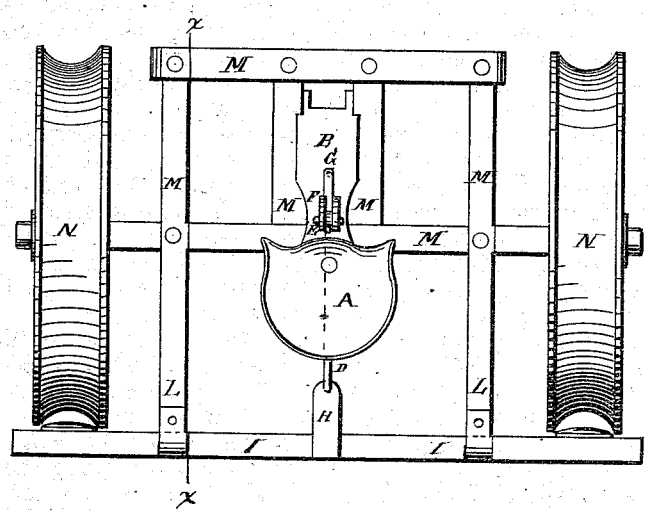

Figure 1 is a side elevation of a device embodying the elements of my invention, with a portion of one of the wheels broken out. Fig. 2 is a top or plan view of the same.

A in the accompanying drawings is the driver's seat of a seed-planter, supported by the standard B, through which passes the rod D, flattened at its end, and having an aperture, through which passes the bolt or pivot E, connecting the rod eccentrically with the cam, and between the walls thereof, the cam being provided with the lever G. From the standard B the rod D extends downward and rearward, passing through the projecting flange H, below which it is supplied with a button; or the end of the rod may be threaded and furnished with a nut to increase its tension. The flange H is secured to the bar I, which turns in bearings at the ends of the bars L of the frame M, and has near its ends, opposite the wheels N, the scrapers P, which may be of any suitable construction.

The operation is as follows: To bring the scrapers against the wheels it is only necessary to turn up the lever G, which rotates the cam F, interposing a greater breadth of material between the end of the rod and the standard B, thus drawing the rod D upward and forward, which turns the bar I, bringing the scrapers P in contact with the wheels N. A contrary movement of the lever reverses the operation, and removes the scrapers from impact with the wheels. When the lever G is elevated the scrapers are locked firmly against the wheels.

What I claim as my invention, and desire to secure by Letters Patent, is—

The eccentric cam F, lever G, and rod D, in combination with the bar I, provided with the scrapers P, for the purpose of operating the scrapers, and locking them upon the wheels, substantially as shown and described.

In testimony that I claim the foregoing improvements in wheel-scrapers, as above described, I have hereunto set my hand and seal this 19th day of August, 1874.

JOSEPH C. BARLOW. [L. S.]

Witnesses:
    WM. H. MINNIX,
    C. P. WEBSTER.